US009321159B2

(12) United States Patent
May (10) Patent No.: US 9,321,159 B2
(45) Date of Patent: Apr. 26, 2016

(54) IMPACT TOOL (75) Inventor: Lutz May, Starnberg (DE)

(73) Assignee: Dino Paoli S.r.l. (IT)

( * ) Notice: Subject to any disclaimer, the term of this patent is extended or adjusted under 35 U.S.C. 154(b) by 898 days.

(21) Appl. No.: 13/525,487

(22) Filed: Jun. 18, 2012

(65) Prior Publication Data

US 2012/0318552 A1 Dec. 20, 2012

Related U.S. Application Data (60) Provisional application No. 61/506,734, filed on Jul. 12, 2011.

(30) Foreign Application Priority Data

Jun. 17, 2011 (IT) .............................. MO2011A0152
Jun. 17, 2011 (IT) .............................. MO2011A0153
Jun. 17, 2011 (IT) .............................. MO2011A0154

(51) Int. Cl.
*B25B 23/14* (2006.01)
*B25B 23/145* (2006.01)
*B25B 23/147* (2006.01)
*B23P 19/06* (2006.01)

(52) U.S. Cl.
CPC .............. *B25B 23/14* (2013.01); *B23P 19/065* (2013.01); *B25B 23/1405* (2013.01); *B25B 23/1456* (2013.01); *B25B 23/1475* (2013.01)

(58) Field of Classification Search
CPC .... B25B 21/02; B25B 23/14; B25B 23/1405; B25B 23/1456; B25B 23/1475; B25B 23/145; B25B 23/147; B23P 19/066; G01L 3/102
USPC ............ 173/2, 176, 178, 181, 182, 183, 104, 173/109, 128, 93, 93.5, 217; 73/862.21, 73/862.333, 862.336
See application file for complete search history.

(56) References Cited

U.S. PATENT DOCUMENTS

| 4,305,471 | A | * | 12/1981 | Eshghy .................. B25B 23/14 173/183 |
| 4,316,512 | A | * | 2/1982 | Kibblewhite ...... G01D 5/24404 173/183 |
| 5,170,358 | A | * | 12/1992 | Delio ................. G05B 19/4163 173/2 |
| 5,289,886 | A | * | 3/1994 | Shikata ................. B23P 19/066 173/181 |
| 5,366,026 | A | * | 11/1994 | Maruyama ............ B23P 19/066 173/180 |
| 5,708,216 | A | * | 1/1998 | Garshelis ................ G01L 3/102 73/862.333 |
| 5,715,894 | A | * | 2/1998 | Maruyama .......... B25B 23/1456 173/180 |
| 6,134,973 | A | * | 10/2000 | Schoeps .............. B25B 23/1453 173/183 |
| 6,311,786 | B1 | * | 11/2001 | Giardino ............. B25B 23/1405 173/1 |
| 6,371,218 | B1 | * | 4/2002 | Amano ............... B25B 23/1475 173/176 |

(Continued)

FOREIGN PATENT DOCUMENTS

EP 0642890 A1 8/1994
EP 1595650 A2 11/2005

(Continued)

*Primary Examiner* — Scott A. Smith
(74) *Attorney, Agent, or Firm* — Laubscher, Spendlove & Laubscher, P.C.

(57) ABSTRACT

In a pneumatic impact wrench there is an output shaft that is connectable in a removable manner to a screw coupling member; a torque sensor, which is mounted on the shaft, sends signals to a control unit that calculates the energy transferred through the output shaft and controls the wrench on the basis of a comparison between the calculated energy and a predefined threshold value.

10 Claims, 8 Drawing Sheets

(56) References Cited

U.S. PATENT DOCUMENTS

| | | | | |
|---|---|---|---|---|
| 6,607,041 B2* | 8/2003 | Suzuki | .................... | B25B 21/02 |
| | | | | 173/11 |
| 6,761,229 B2* | 7/2004 | Cripe | .................. | B25B 23/1405 |
| | | | | 173/1 |
| 6,868,742 B2* | 3/2005 | Schoeps | .............. | B25B 23/1405 |
| | | | | 73/862.21 |
| 6,968,908 B2* | 11/2005 | Tokunaga | ............... | B25B 21/02 |
| | | | | 173/181 |
| 7,216,723 B2* | 5/2007 | Ohtsu | .................... | B25B 21/02 |
| | | | | 173/117 |
| 7,395,871 B2* | 7/2008 | Carrier | ...................... | B25F 5/00 |
| | | | | 173/1 |
| 7,410,006 B2* | 8/2008 | Zhang | .................. | B23D 59/001 |
| | | | | 173/1 |
| 7,424,919 B2* | 9/2008 | Friberg | ............... | B25B 23/1456 |
| | | | | 173/1 |
| 7,828,077 B1* | 11/2010 | Miller | .................... | B23Q 5/045 |
| | | | | 173/18 |
| 8,403,072 B2* | 3/2013 | Eshleman | ............... | B25B 21/00 |
| | | | | 173/1 |
| 2002/0134172 A1* | 9/2002 | Yamada | ................. | B25B 21/02 |
| | | | | 73/862.21 |
| 2003/0065474 A1 | 4/2003 | McGee et al. | | |
| 2004/0182587 A1 | 9/2004 | May | | |
| 2005/0230130 A1 | 10/2005 | Strasser et al. | | |
| 2007/0103104 A1 | 5/2007 | May | | |
| 2008/0178713 A1 | 7/2008 | Long et al. | | |
| 2009/0250233 A1 | 10/2009 | Wallace | | |

FOREIGN PATENT DOCUMENTS

| | | |
|---|---|---|
| EP | 22848632 A1 | 11/2010 |
| GB | 2392966 A | 3/2004 |
| WO | 03006211 A1 | 1/2003 |
| WO | 2004029569 A1 | 4/2004 |

\* cited by examiner

IMPACT TOOL

BACKGROUND OF THE INVENTION

The invention relates to an impact tool, in particular an impact wrench.

Specifically, but not exclusively, the invention may be used to lock a bolt on a threaded hub of a wheel, for example to change rapidly the wheels of a car during a race.

In particular, the invention refers to an impact tool in which: a rotating mass (hammer), that acts as a flywheel for storing mechanical energy, is rotated by a motor (in generally of the pneumatic type); a rotating shaft is fixed to an anvil rotated by the hammer by means of a series of impacts (generally one impact for each rotation); the connection mechanism between hammer and anvil comprises a clutch that, after each impact, leaves the hammer free again to rotate and can be driven, for example, by a cam system. In use, an external device (for example a screw coupling member) is removably connected to the rotating shaft, generally by interposing a mechanical adapter.

More in particular the invention refers to an impact tool having a torque sensor that is operationally associated with the output shaft. Such a sensor is known, for example, from the patent publication US 2007/0103104 A1.

The use of a pneumatic impact wrench for fitting and removing wheels from a motor vehicle is known, in which the tightness of the (normally alloy) bolt that locks the wheel on the (normally hardened and tempered steel) hub must be safe and reliable, also when the stress transmitted by the wheels to the hub is high, as occurs in a motor vehicle competing in a car race.

It is thus desirable that the screwdriver rotates fast but also ensures appropriate tightness, with a known torque, so as not to damage the bolt, to ensure the maintenance of the coupling between bolt and hub in all conditions, for example during a competition.

It is therefore desirable to stop the screwdriver at the most appropriate moment, neither too soon or too late, such that the tightening works locks the wheel, but without damaging the screw coupling.

Patent publication US 2004/0182587 A1, for example, teaches measuring the torque on the output shaft of a pneumatic impact tool, using contactless sensors of magnetic type and stopping the tool when a threshold value of the detected torque is detected.

SUMMARY OF THE INVENTION

One object of the invention is to provide a impact tool with a monitoring system of the action exerted by the tool on an external device.

One advantage is to determine precisely and reliably when a screw-locking member has been tightened appropriately.

One advantage is to make available an impact tool with a system for controlling the torque applied by the output shaft.

One advantage is to stop the impact tool at the moment in which the intervention of the tool on an external device has been concluded appropriately.

One advantage is to give rise to an impact tool of simple construction and of great reliability.

One advantage is to provide a monitoring system with contactless sensors that is suitable for use in significantly critical situations, such as, for example, in the field of an impact tool in which the dynamic stress is high and complex.

One advantage is to associate an impact tool with a monitoring system having relatively reduced weight and dimensions.

One advantage is to devise a precise and reliable method for processing signals received by the sensors system applied to the impact tool.

Such objects and advantages, and still others, are achieved by the impact tool according to one or more of the claims set out below.

BRIEF DESCRIPTION OF THE DRAWINGS

The invention can be better understood and actuated with reference to the attached drawings that illustrate an embodiment thereof by way of non limiting example.

DETAILED DESCRIPTION

With reference to the aforesaid figures, overall with 1 impact tool has been indicated that, in the case in point, is an impact wrench that is usable, for example, for fitting and removing wheels of motor vehicles, in particular racing cars.

Figure 1:
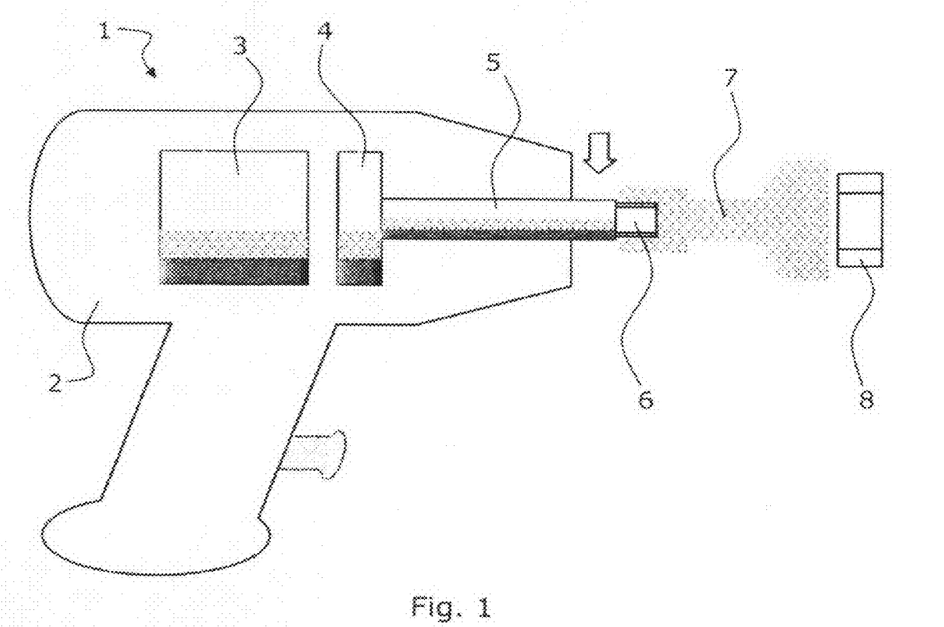
FIG. 1 is a diagram of an embodiment of an impact tool according to the present invention.

The impact tool 1 comprises a housing 2 that houses internally a rotating hammer 3 rotated by a motor (in FIG. 1 the motor and the rotating hammer 3 have been schematised in a single block). In the case in point the motor is of the pneumatic type. The rotating hammer 3 acts as a flywheel for accumulating mechanical energy.

The impact tool 1 comprises a rotating anvil 4 arranged in the housing 2 and rotated by the rotating hammer 3 by a series of impacts. The coupling system (that is of known type and is not illustrated) between the hammer 3 and the anvil 4 may comprise a front clutch driven by a cam system that periodically connects and disconnects (for example once a revolution) the hammer 3 and the anvil 4 to and from one another. The coupling between hammer and anvil may be made in such a way that at each revolution the hammer 3 couples for a short period of time (for a fraction of a revolution) with the anvil 4, giving the anvil 4 a rotation pulse with a high torque impact.

An output shaft 5 rotates around an axis together with the rotating anvil 4. The shaft 5 may have, as in the case in point, a proximal end at the anvil and a distal end that, as in this case, may protrude from the housing 2. The distal end may end as a fitting element 6 for removable connection with an external device. The fitting element 6 may comprise, for example, a square fitting. The external device may comprise, for example, a mechanical adapter 7 that is suitable for connecting the fitting element 6 with a screw member 8 (for example a nut for locking a wheel on a hub).

In use, when the operator activates the tool, for example by pressing a start button, a supply of compressed air drives the pneumatic motor that commands the rotating hammer that, by hitting the rotating anvil repeatedly, rotates the output shaft applied to the external device (screw coupling member). In the case of a screwdriver, a screw coupling member will be screwed (or unscrewed) by the intermittent action of a succession of torsional impacts. In initial impacts, the rotations of the output shaft will, for each impact, be relatively high and will then decrease as the final situation approaches in which the external device (for example the screw coupling member) has been rotated (screwed) to the desired tightness.

Figure 2:
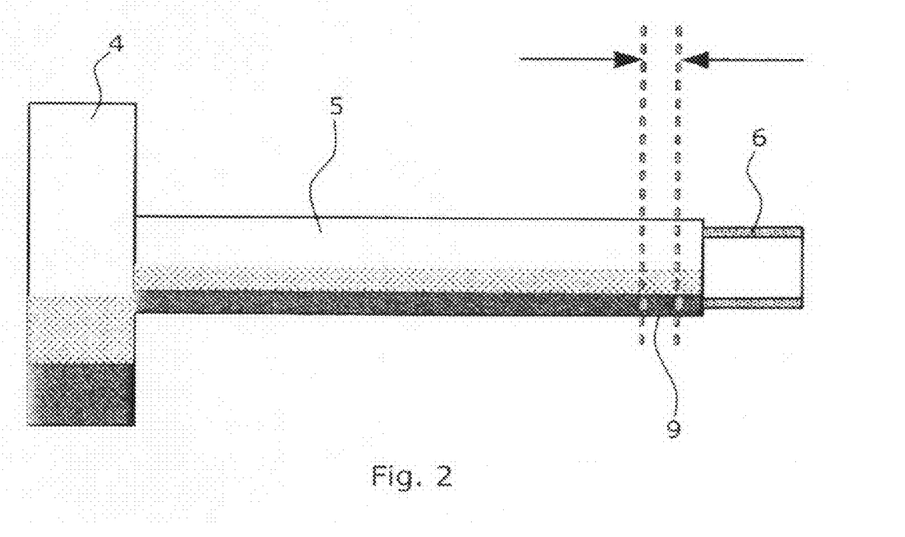
FIG. 2 shows the output shaft and the anvil of the tool in FIG. 1.

The distal end of the shaft comprises an end portion 9 to which is applied (integrally or removably) at least one torque sensor for detecting a torque of the rotation shaft 5. In FIGS. 1 and 2 the torque sensor is not illustrated. It has been found that the end portion 9, that is interposed axially between the fitting element 6 and the zone of the housing 2 from which the distal end protrudes (the portion 9 is indicated by an arrow in FIG. 1 and is bound by a pair of dashed lines in FIG. 2), is the most suitable portion of shaft for positioning the torque sensor, in order to determine precisely the torque that the tool actually applies to the external device, i.e. in this case, to the mechanical adapter 7 and thus to the screw member 8. The torque sensor may comprise a contactless sensor, for example a sensor of magnetic type. The torque sensor may comprise, for example, at least one coil wound around the distal end portion 9 arranged next to the fitting element 6. In particular, the coil will be arranged, as said, in the axial space (see FIG. 2) comprised between the fitting element 6 and the housing surface from which the distal end of the shaft 5 protrudes outwards. In the output shaft of a usual impact wrench, this axial space may be very relatively reduced, for example to about 6-8 millimeters.

Figure 3:
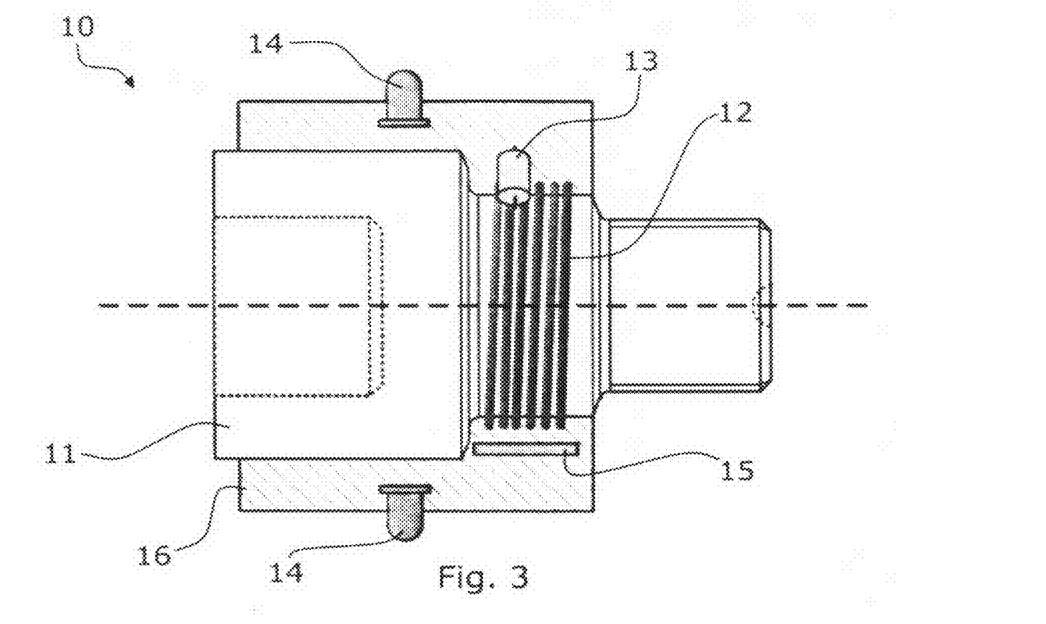
FIG. 3 is a section of a portion of shaft provided with a sensor unit according to the invention.
Figure 4:
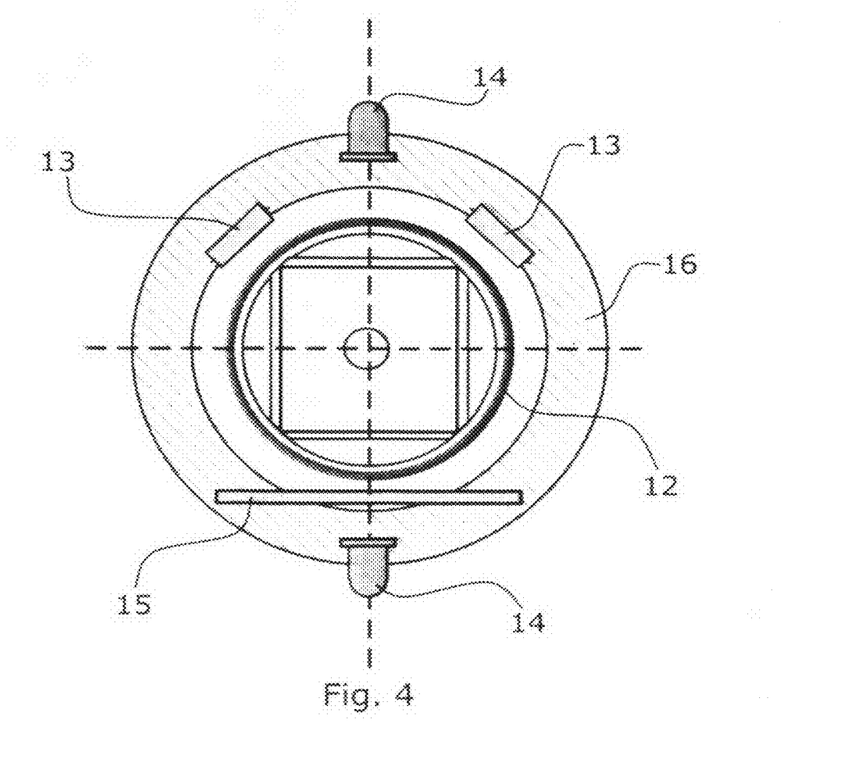
FIG. 4 is a partially sectioned front view of the portion of shaft in FIG. 3.

The torque sensor may be constructed integrally with the shaft or be associated with an insert that is insertible around the shaft or coupled to an end of the shaft. In FIGS. 3 and 4 there is shown an example of an insert provided with the torque sensor. In this case the insert 10 comprises a portion of shaft 11 that can be joined coaxially with the shaft 5 (forming in substance an extension of the shaft itself) to give rise to a portion of distal end that carries the torque sensor. The insert 10 may comprise, as in this case, a female fitting element (for example of square shape) on one side (for example the side that is joined coaxially with an end of the shaft) and a male fitting element (for example of square shape) on the opposite side (for example for making the fitting element to which the external device will be connected). The same arrangement of elements shown in FIGS. 3 and 4 (arranged around the portion of shaft 11) may be constructed integrally with the shaft 5 (in the space indicated in FIG. 2). This arrangement of elements forms a sensor unit that will be disclosed below.

The tool 1 may comprise, both in the embodiment that is fittable on the shaft and in the embodiment that is integrated with the shaft, a sensor unit like the one illustrated in FIGS. 3 and 4, that is provided with a torque sensor, with a sensor arrangement for detecting an absolute rotation angle of the shaft around the rotation axis, with an optical indicating arrangement for emitting visible signals to an operator and with a control unit that controls the optical indicating arrangement in response to the signals received from the torque sensor and from the rotation angle sensor arrangement.

The aforesaid torque sensor comprises at least one coil 12 wound around the rotation axis of the shaft 5 (in particular around the portion 9 of distal end adjacent to the fitting element).

The aforesaid sensor arrangement of the rotation angle may comprise, as in this example, an array of ambient magnetic field sensors 13, with two or more axes, which is arranged to rotate together with the output shaft of the tool. In the case in point two ambient magnetic field sensors 13 are shown that are arranged at 90° to one another. The sensors 13 are arranged on the same orthogonal plane to the rotation axis. These sensors 13 may have, in particular, a measuring range of at least +/−2 Gauss (suitable for the terrestrial magnetic field). Such sensors 13 may have, more in particular, an absolute sensitivity range of at least +/−10 Gauss (to be able to operate with possible interfering magnetic fields). The magnetic field sensors 13 may comprise, for example, flux-gate sensors, Hall-effect sensors, magnetoresistive sensors, giant magnetoresistive sensors or other magnetic field sensors.

The aforesaid optical indicating arrangement may comprise one or more LEDs 14 (in this case at least two LEDs arranged angularly spaced apart from one another, for example two LEDs diametrically opposite one another).

The aforesaid control unit may comprise an electronic module 15.

The sensor unit, comprising in this case the coil 12, the sensors 13, the LEDs 14 and the module 15, may be associated with a tubular body 16 that may in turn be coupled (integrally or removably) around the portion of shaft 11 (or around the distal portion 9 end illustrated in FIGS. 1 and 2).

In the case in point the shaft extension, with which the sensor unit is associated, is provided with a square mechanical interface on both ends, although it is possible to provide other types of interface.

The shaft extension, with which the sensor unit has been is associated, is made of a ferromagnetic material and may be, in particular, hardened to minimise absorption of the pulses of the rotating impacts and the hysterisis of the torque signal.

Figure 5:
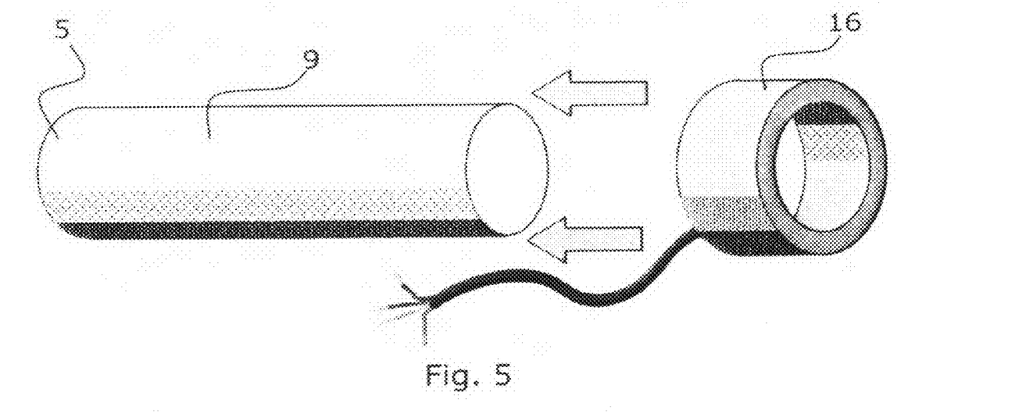
FIGS. 5 and 6 show two inserting steps of a sensor unit, made according to the invention, on an end of an output shaft.
Figure 6:
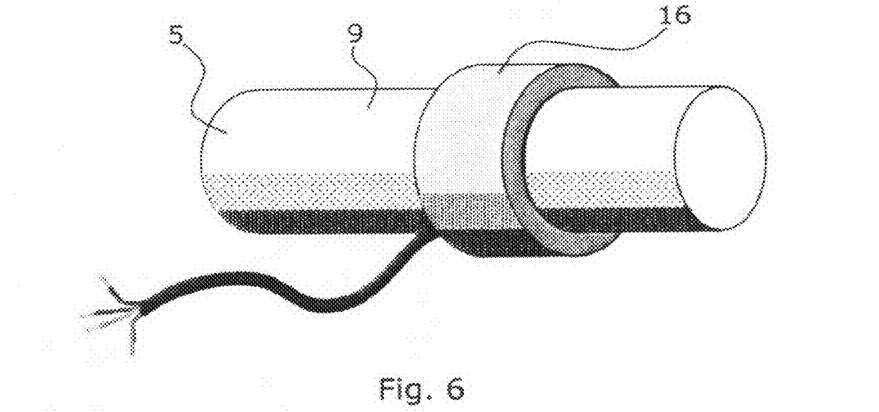

In FIGS. 5 and 6 there is shown a possible way of coupling a sensor unit (for example the same as the sensor unit shown in FIGS. 3 and 4) with the distal end of the shaft. An integral coupling will be provided in which the sensor unit, in particular the coil (or the coils), rotates together with the output shaft 5 of the tool. Alternatively, rotatable coupling can be provided in which the shaft 5 rotates in relation to the sensor unit, in particular with respect to the coil (or the coils), that in this case will be associated with the housing 2.

Figure 7:
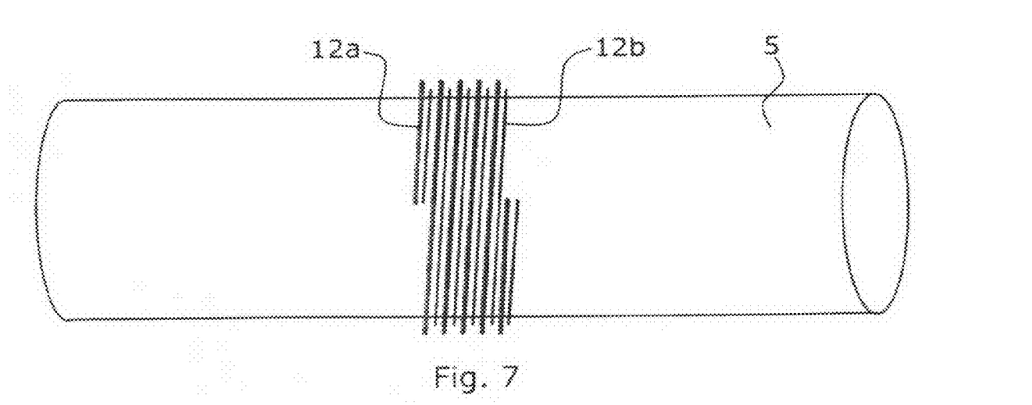
FIG. 7 is a diagram of an example of an arrangement of coils for a torque sensor.
Figure 8:
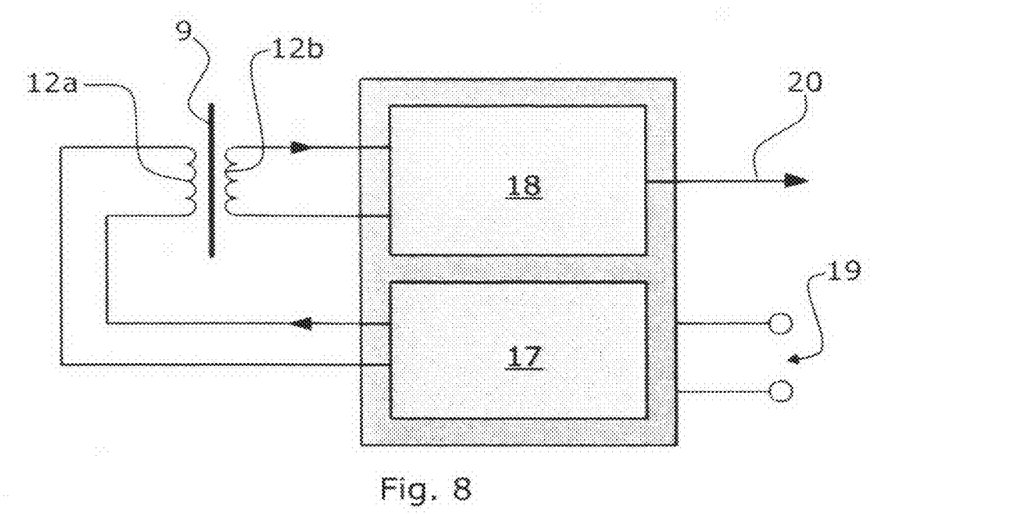
FIG. 8 is a diagram of a torque sensor made according to the invention.

The torque sensor may comprise at least two coils (as in FIG. 7) wound around the rotation axis, in particular around the aforesaid distal end portion 9 or the portion of shaft 11, in which a coil (generator coil 12a) acts as a magnetic field generator and the other coil (sensor coil 12b) operates as a magnetic field sensor. The generator coil 12a will be connected (FIG. 8) to a first (electronic) module 17 that comprises a driver and a signal generator. The sensor coil 12b will be connected to a second (electronic) module 18 to condition the analog signal (supplied by the sensor coil 12b) and to process the analog signal to supply an outlet signal 20. The torque sensor will be provided with an (electric) energy supply 18, for example a battery.

The various sensor elements, the electronic components, the signal outputs and the electric energy supply (battery) may be, for example, mounted around the portion of shaft 11 (or around the portion 9) and may be further covered with a mechanical protection (not shown) to prevent damage, for example if the tool is dropped onto the ground.

Figure 9A:
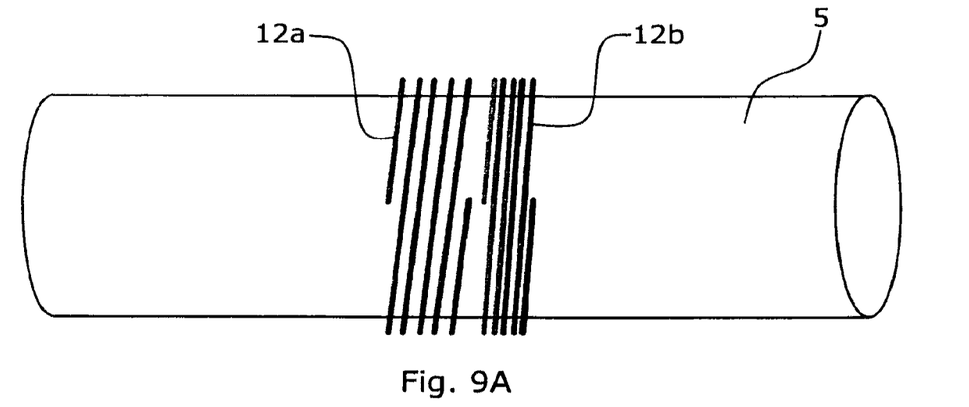
FIGS. 9A to 9C show other three examples of arrangements of coils for a torque sensor.
Figure 9B:
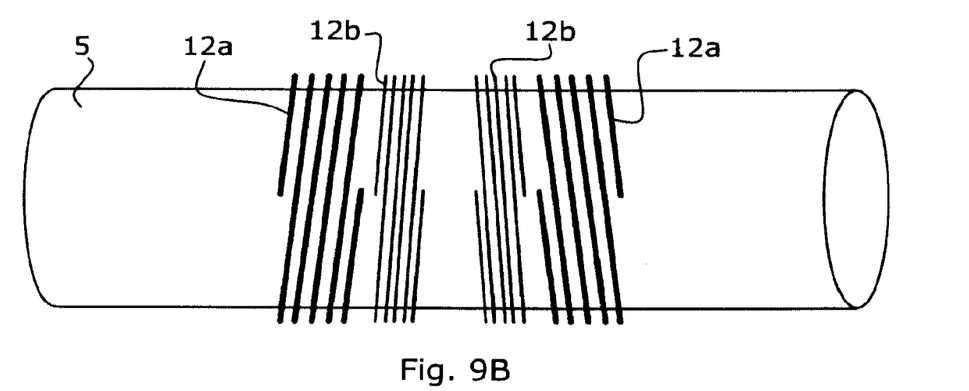
Figure 9C:
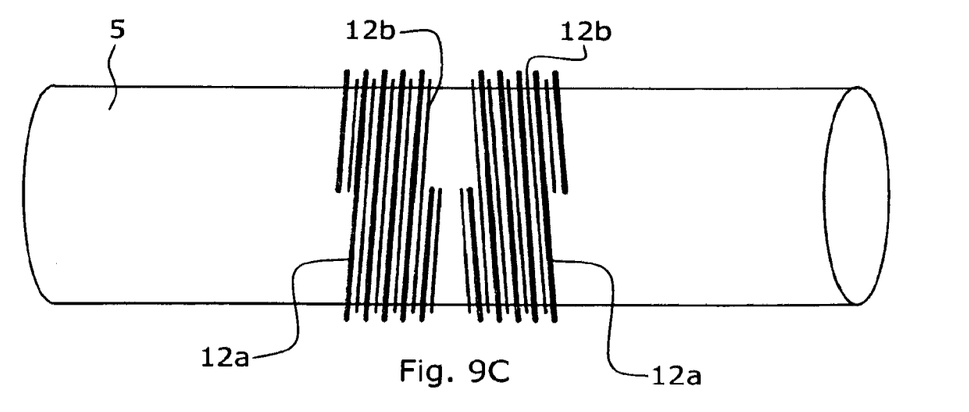

In FIGS. 9A to 9B there are illustrated some examples of possible diverse arrangements of coils (generator coils 12a and sensor coils 12b), that are wound around the rotation shaft (in particular around the distal portion 9 end or around the portion of shaft 11) and are usable for making the torque sensor (to be used, for example, in the sensor unit of FIGS. 3 and 4).

The control unit is configured for receiving the signals emitted by the array of sensors 13 that detect the rotation angle of the shaft 5 and controlling an actuator (for example the optical indicating arrangement and/or the motor driving the rotating hammer 3) on the basis of these signals. The control may comprise, for example, the arrest of the motor and/or the switch-on of the optical indicating arrangement. The control may be activated, for example, when the angular movement of the shaft 5 for a single impact becomes less or the same as a threshold value.

The control unit can be configured for receiving the signals emitted by the torque sensor (i.e. signals indicating torque on the shaft) and for determining the reaching of a desired situation on the basis of these signals, to then possibly activate accordingly the optical indicator (LED 14). The desired situation may be reached, for example, when the torque becomes greater than or the same as a preset and programmable threshold value. The control unit is programmed for switching on the optical indicator when the screwing process has been completed.

The absolute angular position of the rotating shaft, in particular the angular position thereof in relation to the terrestrial magnetic field, in order to determine the actual rotation of the external device associated with the tool, can be calculated, specifically but not exclusively, with a sin-cos algorithm (for example arc-tan-2). The rotational field, which need not be perfectly symmetrical, may be processed by the control unit, for example with linearising algorithms of known type.

The control unit may be configured for determining the rotation angle (rotation angle in relation to the terrestrial or ambient magnetic field) of the sensor unit (and thus of the output shaft) upon receipt of the first torsional pulse due to the hammer-anvil impact. At each subsequent torsional pulse the sensor unit and the shaft will rotate, suddenly changing the angular position, so that the sensor arrangement of the rotation angle will send the signals indicating the change of angular position. The control unit will be able to determine the difference between the angular position of the sensor group before and after each impact.

Figure 10:
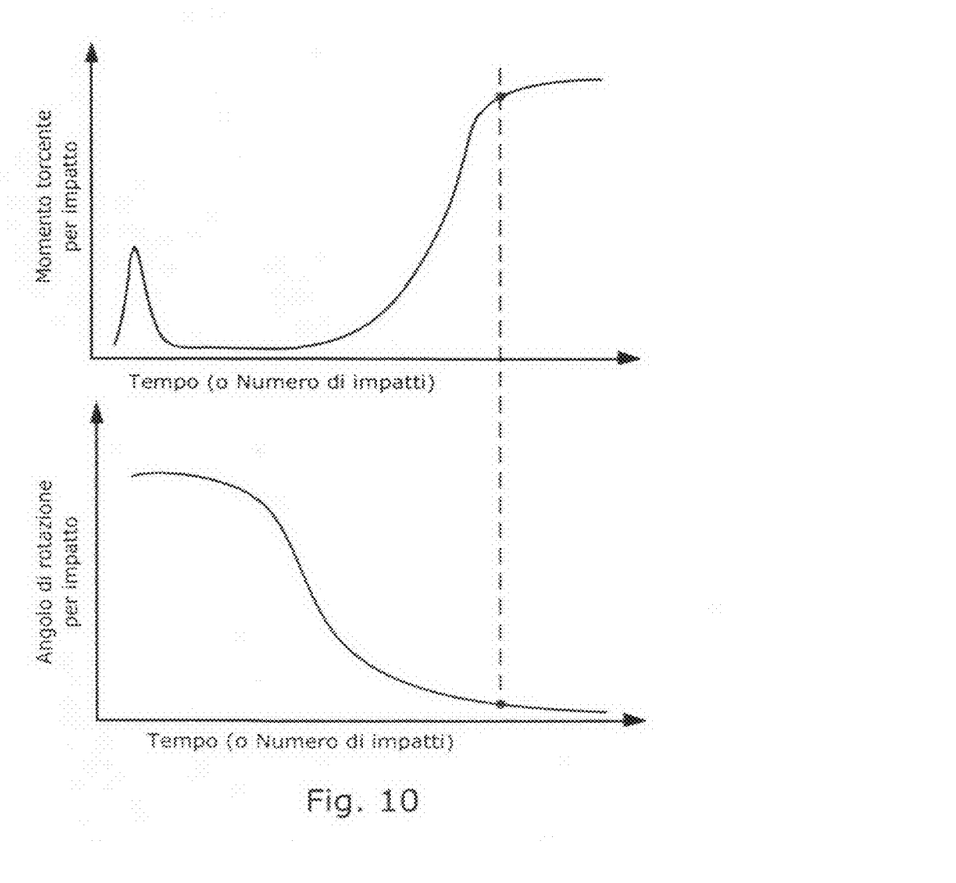
FIG. 10 shows the torque and rotation angle patterns of the output shaft of the impact tool.

In FIG. 10 there are illustrated two diagrams that show—in the upper diagram—the pattern of the torque on the rotating shaft at each impact in function of the time (or the number of impacts) and—in the lower diagram—the pattern of the angular movement of the shaft at each impact as a function of the time (or the number of impacts). With a dashed vertical line there is illustrated a possible moment at which the control unit detects the reaching of the desired situation, a moment which will correspond, in particular, to the condition of optimum tightening of the screw connection member.

Figure 11:
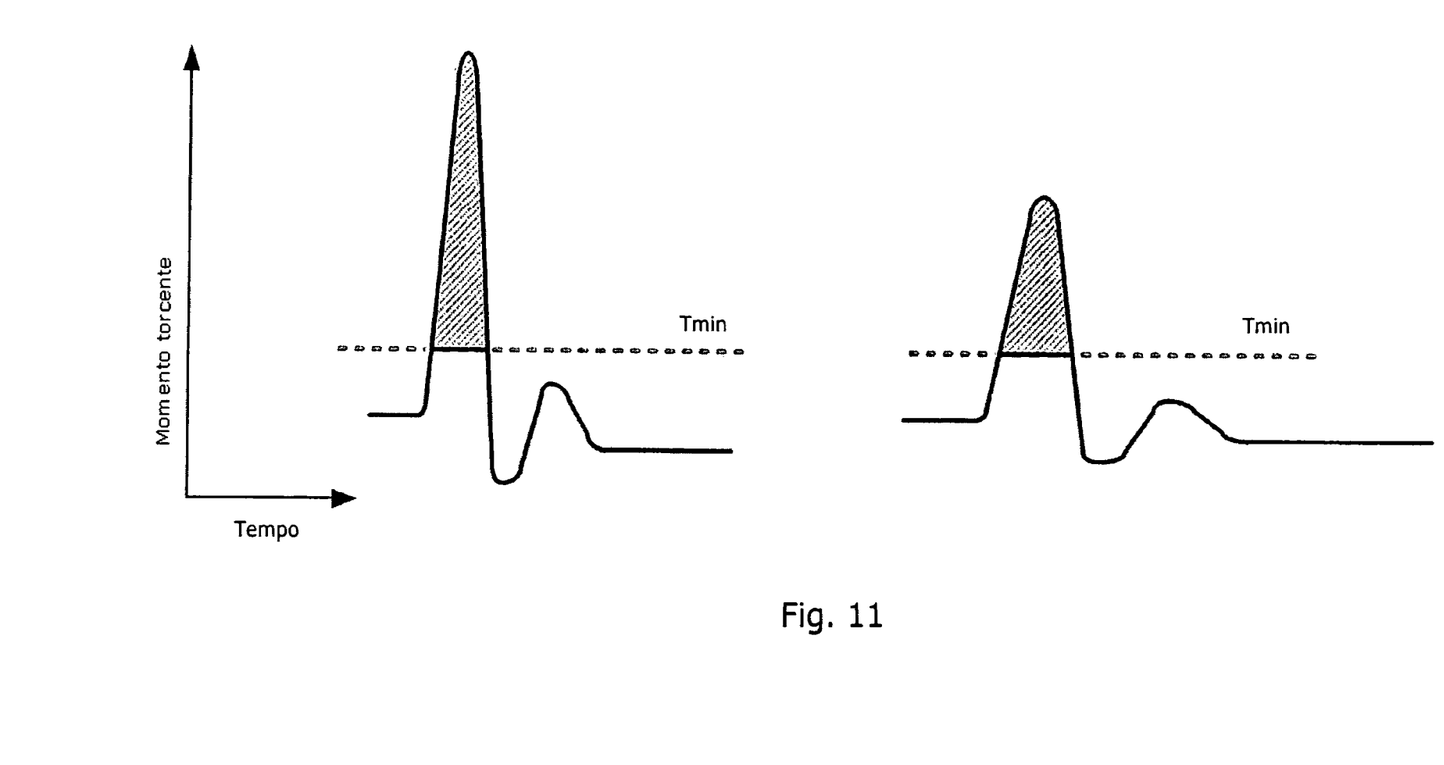
FIG. 11 shows a torque diagram of the output shaft for two different impacts.

The control unit may be configured for using the signals received from the torque sensor such as to determine an energy value transferred through the shaft 5 by an integration calculation of the values of the torque over time. The possible control of the actuator(s) can thus occur on the basis of the aforesaid calculated energy value. The integration calculation can take into account, at every single hammer-anvil impact, a plurality of the torque values measured and supplied by the torque sensor. Substantially, it will be possible to determine the energy actually transferred from the rotating shaft to the external device by calculating the area defined by the curve of the torque in function of time, as is clear from FIG. 11, in which two examples of impact pulses are shown, on the left a typical impact and on the right a low-energy impact. The dashed areas represent, for each impact, the energy actually transferred through the rotating shaft 5.

It is possible to use different methods for calculating the area below the curve of the torque for each hammer-anvil impact. It is possible, for example, to use an analog to digital converter (ADC) with a sampling frequency of at least 50,000 samples per second or of at least 100,000 samples per second and then to sum every single measurement of qualified analog signals. If, for example, the time of a single impact pulse is 1 milliseconds and the sampling frequency of at least 50,000 samples a second, there will be 50 analog measurements that can be used (in particular added) to obtain the calculation of the area of the surface below the curve of the torque.

Figure 12:
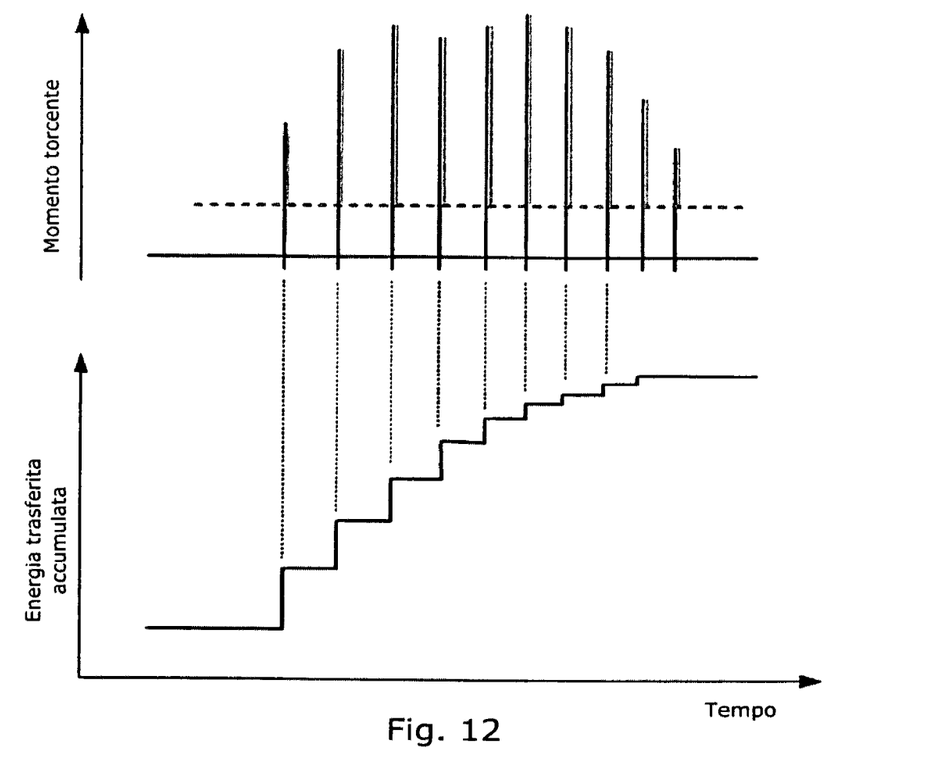
FIG. 12 shows the torque patterns of the output shaft and of the total energy supplied by the output shaft, for a succession of impacts.

In FIG. 12, the upper diagram shows the torque values measured on the shaft during a work cycle of the tool 1, in which the work cycle comprises a series of hammer-anvil impacts, whereas the lower diagram shows, for the same work cycle, the cumulative value over time of the energy actually transferred through the output shaft 5 through the effect of the series of hammer-anvil impacts.

The control unit can be programmed for receiving a threshold value Tmin of the torque (for example a value that is set by the operator and is programmable) and for performing the integration calculation without considering the torque values lower this preset threshold value Tmin. The calculated area will thus be bound below by this threshold value Tmin.

Figure 13:
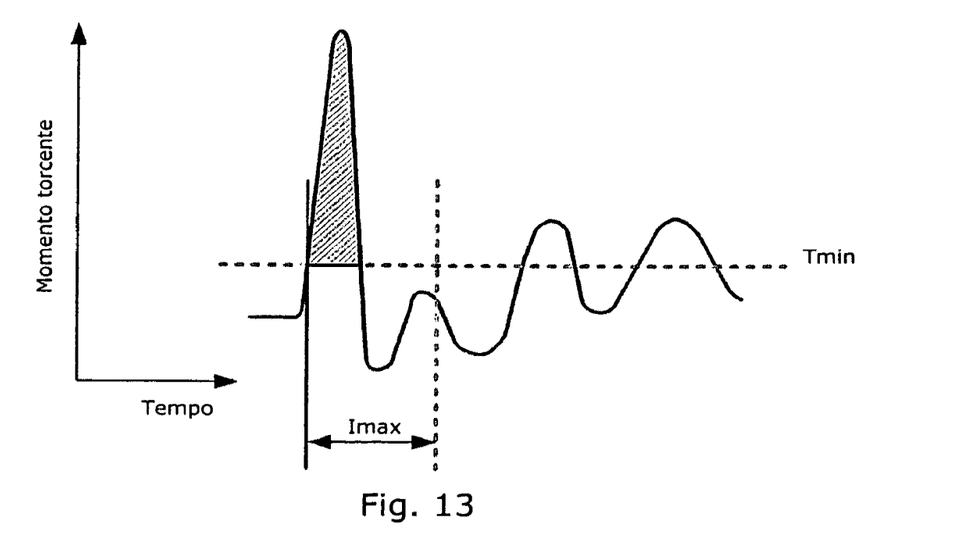
FIG. 13 shows a torque diagram of the output shaft for a single impact.

The control unit can be programmed for receiving a maximum value Imax of the time interval per impact and for running the integration calculation without considering the measured torque values that, for every single hammer-anvil impact, remain outside a time interval that is the same as this maximum value Imax. As in the example in FIG. 13, the maximum interval Imax may start, for each impact, at the moment in which the torque value exceeds the threshold value Tmin; possible torque values that, in the field of the same hammer-anvil impact cycle, admittedly exceed the threshold value Tmin but are detected after the interval defined by the maximum value Imax, will not be considered in the calculation. The control unit is thus programmed for limiting torque data acquisition time for each hammer-anvil impact. The maximum available time is the width of a single impact pulse. The time interval within which the acquired data are considered to be in the calculation is limited (the limit being defined by the value Imax) in particular in order to prevent the "ringing" of the signal, i.e. the undesired oscillation of the signal, interfering with the calculation of the energy actually transferred through the shaft.

The control unit may be programmed for receiving a threshold value of the energy transferred and for comparing value of the actually accumulated energy in the various impacts (from the start of the task performed with the tool, for example, screwing), and calculated in real time, to then control the tool in response to this comparison. It is possible, for example, to stop the motor and/or to switch on the optical signalling arrangement when the energy actually transferred via the output shaft reaches or exceeds the preset threshold value.

Figure 14:
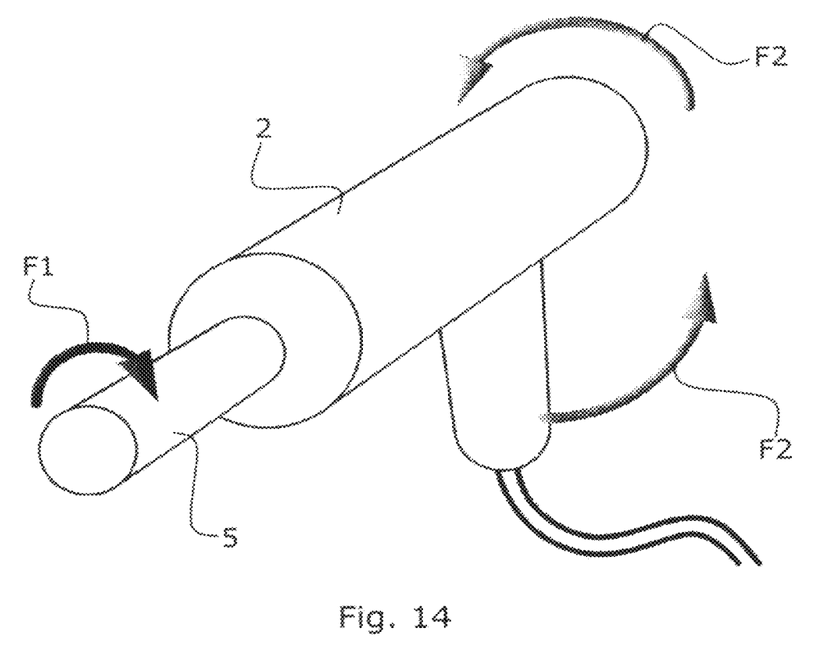
FIGS. 14 and 15 show the impact tool with a system of sensors for detecting the absolute rotation angle of the output shaft.
Figure 15:
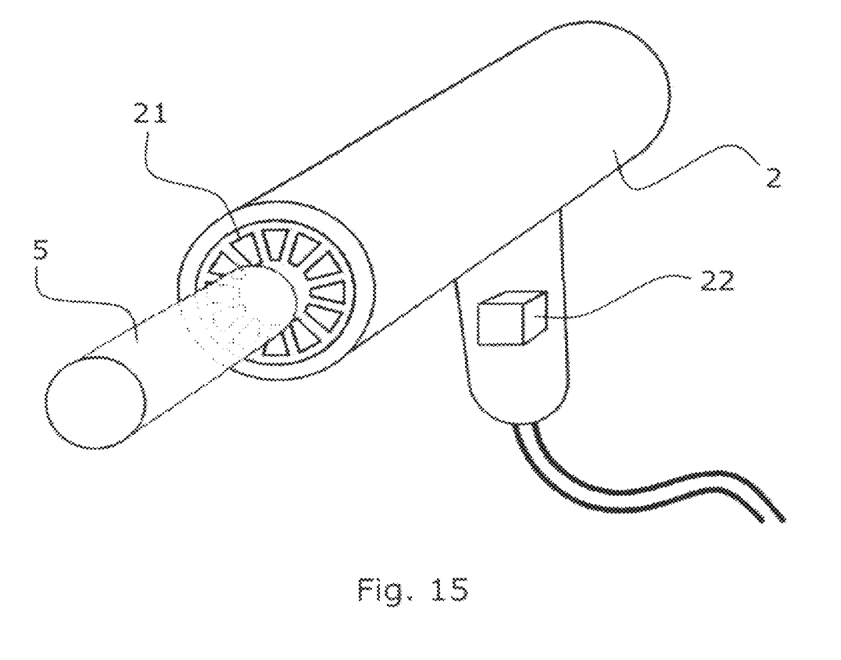

In FIGS. 14 and 15 there is illustrated an alternative manner of implementing the sensor arrangement for detecting the absolute rotation angle of the shaft, in which a first sensor 21 detects a corresponding rotation angle between the shaft 5 and the housing 2 and a second sensor 22 detects the absolute rotation angle around the rotation axis, of the housing 2. The control unit will in this case be configured to determine an absolute rotation angle of the shaft 5 around a rotation axis thereof (which will correspond to the actual rotation angle of the external device rotated by the tool 1) on the basis of the signals emitted by the first sensor 21 and by the second sensor 22. In particular, the absolute rotation angle of the shaft will be the same as the rotation angle measured by the first sensor 21 less the rotation angle measured by the second sensor 22. In FIG. 14 with F1 there is indicated the rotation of the shaft 5 and with F2 the absolute rotation of the housing 2 that is due to movements of the operator holding the tool 1. The first sensor 21 may comprise, for example, an incremental sensor of angular position. The second sensor 22 may comprise, for example, an array of ambient magnetic field sensors with two or more axes (similar to the sensors 13) associated with the housing 2.

In one embodiment that is not illustrated, the sensor arrangement that detects the absolute rotation angle of the shaft comprises (in addition or as an alternative to the magnetic field sensors) an accelerometer that is operationally associated with the shaft. This example can be used, for example, in an environment where there is interference due to magnetic fields that can disturb detection by the magnetic field sensors.

In one embodiment, an impact tool comprises an output shaft with which a torque sensor is operationally associated that is connected to a control unit that is programmed for receiving the torque values measured by the sensor, to calculate the total energy transmitted by the output shaft in the different impacts with an integral calculation over time of the torque, to compare the total energy calculated with a preset threshold value and for controlling the tool on the basis of this comparison.

The sensor arrangement of the absolute rotation angle of the shaft can supply indications that are useful for determining possible drawbacks in the external device, such as, for example, a jam of the screw member (the nut of the wheel) or another defect in the tool and/or in the external device to which the tool is applied.

The digital controller (arranged on board the tool) can be able to process the measurements in real time that are performed by both the sensor systems (shaft torque sensor and sensor of the absolute rotation angle of the shaft).

The impact tool disclosed above is a screwdriver, which is usable in particular for changing the wheels of a vehicle (for example in car races or in garages) or in the building trade, or in other industrial sectors. It is possible to apply the teachings disclosed above to any other type of impact tool with rotating hammer-anvil.

The invention claimed is:

1. An impact tool comprising:
   a housing;
   a rotating hammer arranged in said housing and rotatable by a motor;
   a rotating anvil arranged in said housing and rotatable by said hammer by a series of impacts;
   a shaft rotating around a rotation axis, said shaft having a proximal end fixed to said anvil and a distal end that protrudes from said housing, said distal end terminating in a fitting element for removable connection with an external device;
   at least one magnetic torque sensor for detecting a torque of said shaft, said at least one torque sensor comprising at least one coil wound around a portion of said distal end, said portion being adjacent to said fitting element, said at least one torque sensor comprising at least one further coil wound around said portion of said distal end, said at least one coil operating as a magnetic field generator and said further coil operating as a magnetic field sensor.

2. An impact tool as defined in claim 1, and further comprising a sensor arrangement for detecting an absolute rotation angle of said shaft around said rotation axis.

3. An impact tool as defined in claim 2, wherein said sensor arrangement comprises an array of ambient magnetic field sensors with two or more axes arranged in integral rotation with said shaft.

4. An impact tool as defined in claim 2, wherein said sensor arrangement comprises an accelerometer that is operationally associated with said shaft.

5. An impact tool as defined in claim 2, wherein said sensor arrangement comprises a first sensor for detecting a rotation angle between said shaft and said housing and a second sensor for detecting an absolute rotation angle of said housing around said rotation axis.

6. An impact tool as defined in claim 5, wherein said first sensor comprises an incremental angular position sensor.

7. An impact tool as defined in claim 5, wherein said second sensor comprises an array of ambient magnetic field sensors with two or more axes associated with said housing.

8. An impact tool as defined in claim 1, wherein said at least one torque sensor is integrally constructed with said shaft.

9. An impact tool as defined in claim 1, wherein said at least one torque sensor is associated with an insert that is insertible around said shaft.

10. An impact tool as defined in claim 1, wherein said coil is connected with a first module that comprises a driver and a signal generator and said further coil is connected with a second module to condition an analog signal supplied by said coil and to process said analog signal to supply an outlet signal.

* * * * *